United States Patent
Lu et al.

(10) Patent No.: US 12,389,260 B2
(45) Date of Patent: Aug. 12, 2025

(54) DELAY PERFORMANCE EVALUATION METHOD AND APPARATUS, AND STORAGE MEDIUM

(71) Applicant: ZTE CORPORATION, Shenzhen (CN)

(72) Inventors: Liuming Lu, Shenzhen (CN); Liquan Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 409 days.

(21) Appl. No.: 17/911,366

(22) PCT Filed: Dec. 30, 2020

(86) PCT No.: PCT/CN2020/141221
§ 371 (c)(1),
(2) Date: Sep. 13, 2022

(87) PCT Pub. No.: WO2021/184917
PCT Pub. Date: Sep. 23, 2021

(65) Prior Publication Data
US 2023/0096640 A1    Mar. 30, 2023

(30) Foreign Application Priority Data
Mar. 15, 2020   (CN) .......................... 202010178788.0

(51) Int. Cl.
*H04W 28/02*   (2009.01)
*H04L 43/0852* (2022.01)
*H04W 28/08*   (2023.01)

(52) U.S. Cl.
CPC ..... *H04W 28/0236* (2013.01); *H04L 43/0852* (2013.01); *H04W 28/0975* (2020.05)

(58) Field of Classification Search
CPC ......... H04W 28/0236; H04W 28/0975; H04W 84/12; H04W 24/08; H04L 43/0852; H04L 43/50
See application file for complete search history.

(56) References Cited

U.S. PATENT DOCUMENTS

| | | |
|---|---|---|
| 2008/0170551 A1 | 7/2008 | Zaks |
| 2008/0176519 A1 | 7/2008 | Kwak et al. |
| 2017/0272977 A1* | 9/2017 | Rengarajan ........... H04W 40/16 |

FOREIGN PATENT DOCUMENTS

| | | |
|---|---|---|
| CN | 101390412 A | 3/2009 |
| CN | 101626585 A | 1/2010 |

(Continued)

OTHER PUBLICATIONS

Indian Office Action in Application No. 202227058444 dated Sep. 3, 2023, 6 pages.

(Continued)

*Primary Examiner* — Ayanah S George
(74) *Attorney, Agent, or Firm* — Morgan, Lewis & Bockius LLP (57) ABSTRACT

Provided are a delay performance evaluation method and apparatus and a storage medium. The delay performance evaluation method includes evaluating, by a communication node, a delay performance involved in an internal communication environment of a basic service set (BSS) where the communication node is located according to pre-acquired delay evaluation parameters caused by internal communication contention or control of the BSS; and/or evaluating, by a communication node, a delay performance involved in an external interference of a BSS where the communication node is located according to pre-acquired delay evaluation parameters caused by the external interference of the BSS.

13 Claims, 4 Drawing Sheets

---

A communication node evaluates a delay performance involved in an internal communication environment of the BSS where the communication node is located according to pre-acquired delay evaluation parameters caused by internal communication contention or control of the BSS — 101

The communication node evaluates a delay performance involved in an external interference of a BSS where the communication node is located according to pre-acquired delay evaluation parameters caused by the external interference of the BSS — 102

(56) References Cited

FOREIGN PATENT DOCUMENTS

| | | | |
|---|---|---|---|
| CN | 105828354 A | 8/2016 | |
| CN | 105978653 A | 9/2016 | |
| CN | 109495348 A | 3/2019 | |
| CN | 109510675 A | 3/2019 | |
| RU | 2008115815 A | 10/2009 | |
| WO | WO-2008088737 A3 | 7/2008 | |
| WO | WO-2014175882 A1 * | 10/2014 | ............ H04W 24/10 |
| WO | WO2015187860 A1 | 12/2015 | |

OTHER PUBLICATIONS

International Search Report in Application No. PCT/CN2020/141221 dated Mar. 15, 2021, 4 pages including English Translation.

Chinese Search Report in Application No. 2020101787880 dated Dec. 28, 2023, 4 pages including translation.

Chinese Office Action in Application No. 2020101787880 dated Dec. 28, 2023, 14 pages including translation.

Extended European Search Report in Application No. 20925780.7 dated Mar. 25, 2024, 12 pages.

Acharya et al: "Rate Adaptation in Congested Wireless Networks through Real-Time Measurements", IEEE Transactions on Mobile Computing, IEEE Service Center, Los Alamitos, CA, US, vol. 9, No. 11, Nov. 1, 2010 (Nov. 1, 2010), pp. 1535-1550.

Abouelseoud et al. ( Sony): "Reducing Channel Access Delay for RTA Traffic", IEEE Draft; 11-19-1960-01-00BE-Reducing-Channel-Access-Delay-For-RTA-Traffic, IEEE-SA Mentor, Piscataway, NJ USA, vol. 802.11 EHT; 802.11be, No. 1, Nov. 13, 2019 (Nov. 13, 2019), pp. 1-10.

Lu et al. (ZTE Corporation): "Latency Measurement for Low Latency Applications", IEEE Draft; 11-20-0484-00-00BE-Latency-Measurement-For-Low-Latency-Applications, IEEE-SA Mentor, Piscataway, NJ USA, vol. 802.11 EHT; 802.11be, Mar. 15, 2020 (Mar. 15, 2020), pp. 1-13.

Chinese Search Report in Application No. 2020101787880 dated Aug. 3, 2023, 7 pages including translation.

Chinese Office Action in Application No. 2020101787880 dated Aug. 8, 2023, 16 pages including translation.

\* cited by examiner

DELAY PERFORMANCE EVALUATION METHOD AND APPARATUS, AND STORAGE MEDIUM

CROSS REFERENCE TO RELATED APPLICATIONS

This is a national stage application filed under 37 U.S.C. 371 based on International Patent Application No. PCT/CN2020/141221, filed on Dec. 30, 2020, which claims priority to Chinese Patent Application No. 202010178788.0 filed with the China National Intellectual Property Administration (CNIPA) on Mar. 15, 2020, the disclosure of which is incorporated herein by reference in its entirety.

TECHNICAL FIELD

The present application relates to the field of wireless communication networks, for example, a delay performance evaluation method and apparatus and a storage medium.

BACKGROUND

In a field of wireless networks, the wireless local area network (WLAN) develops rapidly. Wireless Fidelity (WI-FI) is an important part of the WLAN. WI-FI uses unlicensed spectra for data communication, so great uncertainty exists in the communication environment and interference intensity. In WI-FI, an access point (AP) and multiple stations (STAs) with which the AP associates form a basic service set (BSS). WI-FI mainly adopts a distributed coordination function (DCF) and an enhanced distributed channel access (EDCA) mode. A core of the DCF and the EDCA mode is a carrier sense multiple access with collision avoidance (CSMA/CA) mechanism. Although the CSMA/CA can satisfy multi-station fair access and maintain a relatively large throughput, but cannot strictly guarantee to satisfy transmission requirements of low-delay services, especially when a large number of users access. Although a point coordination function (PCF) and hybrid coordination function (HCF) controlled channel access (HCCA) has introduced a non-contention channel access method to achieve a certain degree of controlled service access capability evaluation and scheduling, once service access capability evaluation is interfered in an operating frequency band, the reliability and robustness are greatly reduced.

To support low-delay service operation modes such as virtual reality and online games in WI-FI, a delay performance in the WI-FI communication environment needs to be evaluated, so as to provide an evaluation basis for adjustment and optimization of WI-FI access strategies and methods.

The related art cannot yet achieve the evaluation of the delay performance of WI-FI.

SUMMARY

The present application provides a delay performance evaluation method and apparatus and a storage medium so as to solve the technical problem that a delay performance cannot be evaluated.

An embodiment of the present application provides a delay performance evaluation method. The delay performance evaluation method includes evaluating, by a communication node, a delay performance involved in an internal communication environment of a basic service set (BSS) where the communication node is located according to pre-acquired delay evaluation parameters caused by internal communication contention or control of the BSS; and/or evaluating, by a communication node, a delay performance involved in an external interference of a BSS where the communication node is located according to pre-acquired delay evaluation parameters caused by the external interference of the BSS.

An embodiment of the present application provides a delay performance evaluation apparatus. The delay performance evaluation apparatus includes a processor. The processor is configured to perform the delay performance evaluation method according to any of the preceding embodiments when executing computer programs.

An embodiment of the present application provides a storage medium. The storage medium is configured to store computer programs which, when executed by a processor, perform any delay performance evaluation method in embodiments of the present application.

The preceding embodiments and other non-reserved aspects of the present application and implementations thereof are described in more detail in the brief description of drawings, embodiments, and claims.

DETAILED DESCRIPTION

Embodiments of the present application are described hereinafter in conjunction with drawings.

In view of a problem that WI-FI access technology is difficult to ensure a low delay, in the present application, a communication node evaluates a delay performance involved in an internal communication environment of a BSS according to pre-acquired delay evaluation parameters caused by internal communication contention or control of the BSS where the communication node is located; and/or a communication node evaluates a delay performance involved in an external interference of a BSS according to pre-acquired delay evaluation parameters caused by the external interference of the BSS, so as to provide an evaluation basis for adjustment and optimization of service access strategies and methods, thereby achieving access to low-delay services.

Figure 1:
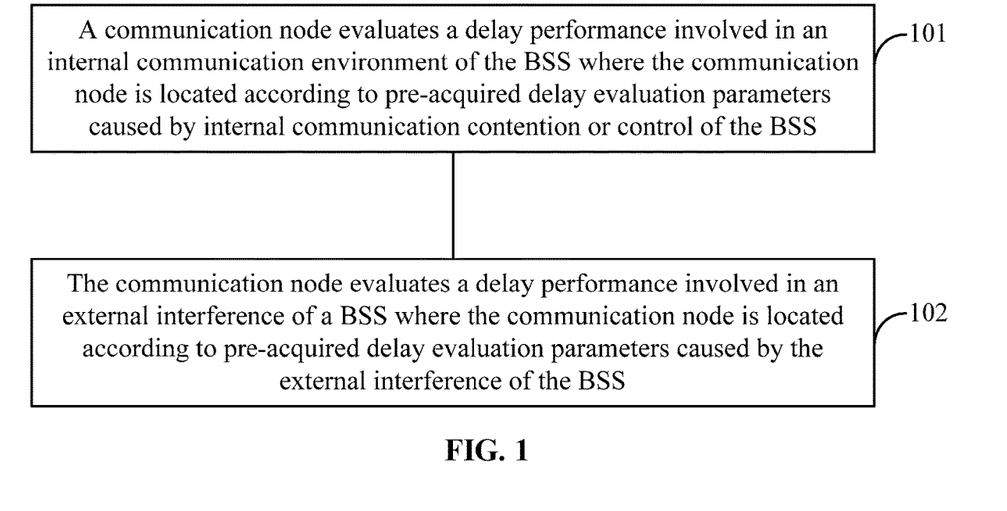
FIG. 1 is a flowchart of a delay performance evaluation method according to an embodiment.

FIG. 1 is a flowchart of a delay performance evaluation method according to an embodiment. This embodiment is applicable to a scenario of evaluating the delay performance. This embodiment may be implemented by a delay performance evaluation apparatus, which may be implemented in software and/or hardware and may be integrated into an access point or a station. As shown in FIG. 1, the delay performance evaluation method according to this embodiment includes the following.

In 101, a communication node evaluates a delay performance involved in an internal communication environment of the BSS where the communication node is located according to pre-acquired delay evaluation parameters caused by internal communication contention or control of the BSS.

In an embodiment, the communication node may be an access point (AP) or a non-AP (non-AP STA), that is, a station. The access point or the station corresponds to a BSS. Optionally, the BSS in this embodiment may be a BSS in WI-FI.

In an embodiment, the delay evaluation parameters caused by the internal communication contention or control of the BSS where the communication node is located is pre-acquired. The communication node may acquire the delay evaluation parameters caused by the internal communication contention or control of the BSS in advance through a test packet.

In 102, the communication node evaluates a delay performance involved in an external interference of a BSS wherein the communication node is located according to pre-acquired delay evaluation parameters caused by the external interference of the BSS.

In an embodiment, the delay evaluation parameters caused by the external interference of the BSS where the communication node is located is pre-acquired. The communication node may acquire the delay evaluation parameters caused by the external interference of the BSS in advance through a test packet.

In an embodiment, the purpose of evaluating the delay performance is to determine whether a main factor affecting a delay is an external factor of the BSS or the internal communication environment of the BSS.

Figure 2:
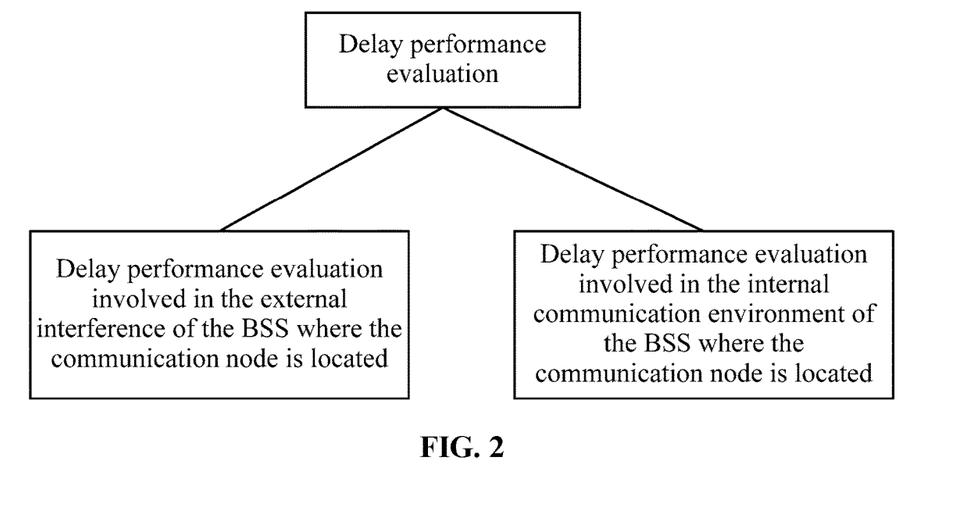
FIG. 2 is a schematic diagram of components of delay performance evaluation according to an embodiment.

FIG. 2 is a schematic diagram of components of delay performance evaluation according to an embodiment. In the evaluation method, the delay performance of a current BSS communication environment may be evaluated based on access requirements of low-delay services. As shown in FIG. 2, two evaluation contents are included: one is delay performance evaluation involved in the external interference of the BSS where the communication node is located, that is, evaluation of a current WI-FI BSS external communication environment and analysis of strengths of interferences from the BSS external such as an overlapping basic service set (OBSS); and the other one is delay performance evaluation involved in the internal communication environment of the BSS where the communication node is located, that is, analysis of busyness of data communication in the BSS communication environment.

It should be understood that the BSS internal or the internal BSS refers to an intra BSS, for example, the internal communication environment of the BSS refers to the communication environment of one intra BSS, the BSS internal waiting time refers to an intra BSS waiting time, and the internal packets of the BSS refers to packets of an intra BSS. Similarly, the BSS external or the external BSS refers to an inter BSS, for example, the BSS external refers to an OBSS.

101 and 102 in this embodiment may be performed alternatively or may be both performed. In a scenario where 101 and 102 are both performed, processes of performing 101 and 102 have no time sequence relationship.

This embodiment provides a delay performance evaluation method. The delay performance evaluation method includes evaluating, by a communication node, a delay performance involved in an internal communication environment of a BSS according to pre-acquired delay evaluation parameters caused by internal communication contention or control of the BSS where the communication node is located; and/or evaluating, by a communication node, a delay performance involved in an external interference of a BSS according to pre-acquired delay evaluation parameters caused by the external interference of the BSS, so as to provide an evaluation basis for adjustment and optimization of service access strategies and methods, thereby achieving access to low-delay services.

Figure 3:
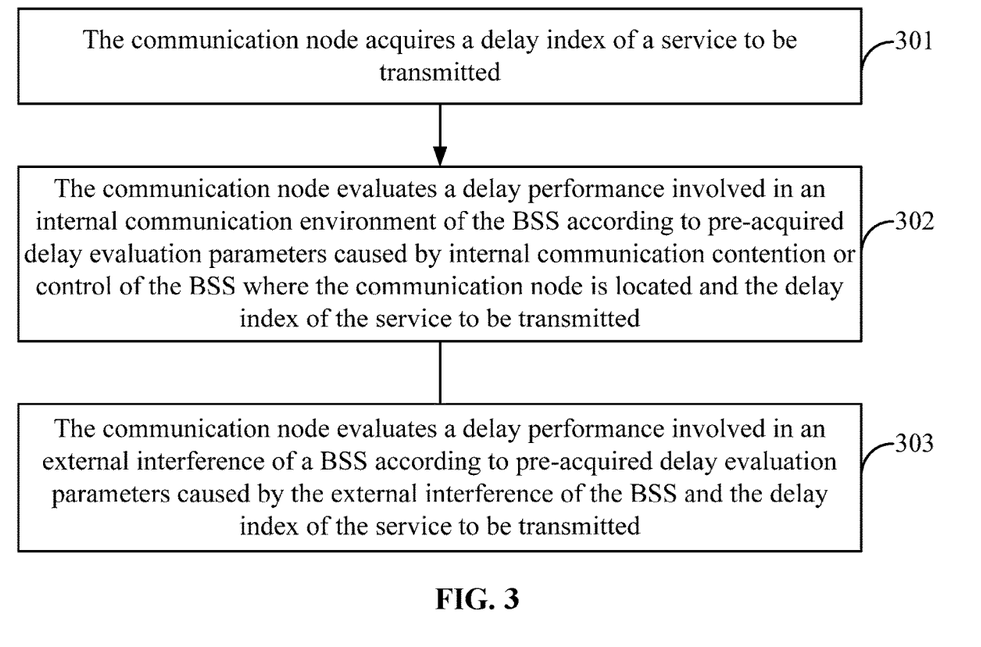
FIG. 3 is a flowchart of a delay performance evaluation method according to another embodiment.

FIG. 3 is a flowchart of a delay performance evaluation method according to another embodiment. As shown in FIG. 3, the delay performance evaluation method according to this embodiment includes the following.

In 301, the communication node acquires a delay indication of a service to be transmitted.

In an embodiment, the communication node may acquire the delay indication of the service to be transmitted from other communication nodes.

In another embodiment, the communication node may acquire the delay indication of the service to be transmitted from a packet of the service to be transmitted.

The service to be transmitted in this embodiment may include low-delay services.

Optionally, the delay indication of the service to be transmitted includes a maximum downlink delay and a maximum uplink delay.

In the present application, after acquiring the delay indication of the service to be transmitted, the communication node may evaluate the delay performance.

In 302, the communication node evaluates a delay performance involved in an internal communication environment of the BSS according to pre-acquired delay evaluation parameters caused by internal communication contention or control of the BSS where the communication node is located and the delay indication of the service to be transmitted.

Optionally, the communication node evaluates the delay performance involved in the internal communication environment of the BSS according to a relationship between the delay evaluation parameters caused by the internal communication contention or control of the BSS where the communication node is located and the delay indication of the service to be transmitted.

In 303, the communication node evaluates a delay performance involved in an external interference of a BSS according to pre-acquired delay evaluation parameters caused by the external interference of the BSS and the delay indication of the service to be transmitted.

Optionally, the communication node evaluates the delay performance involved in the external interference of the BSS according to a relationship between the delay evaluation parameters caused by the external interference of the BSS and the delay indication of the service to be transmitted.

In an embodiment, evaluating the delay performance is to determine whether the main factor affecting the delay is the external factor of the BSS or the internal communication environment of the BSS.

302 and 303 in this embodiment may be performed alternatively or may be both performed. In a scenario where 302 and 303 are both performed, processes of performing 302 and 303 have no time sequence relationship.

In an embodiment, the delay evaluation parameters caused by the internal communication contention or control of the BSS include multiple test internal delays. Correspondingly, 101 or 302 may be: in the case where the communication node determines that the multiple pre-acquired test internal delays and the delay indication satisfy a first preset condition, determining the internal communication environment to be a main factor affecting a delay.

In an embodiment, the delay evaluation parameters caused by the external interference of the BSS include multiple test external delays. Correspondingly, 102 or 303 may be: in the case where the communication node determines that the multiple pre-acquired test external delays and the delay indication satisfy a second preset condition, determining the external factor to be a main factor affecting the delay.

The test internal delays and the test external delays in this embodiment may be collectively referred to as the delay evaluation parameters. Among the delay evaluation parameters, the delay evaluation parameters caused by the internal communication contention or control of the BSS include the test internal delays, and the delay evaluation parameters caused by the external interference of the BSS include the test external delays. The delay evaluation parameters are described below.

Figure 4:
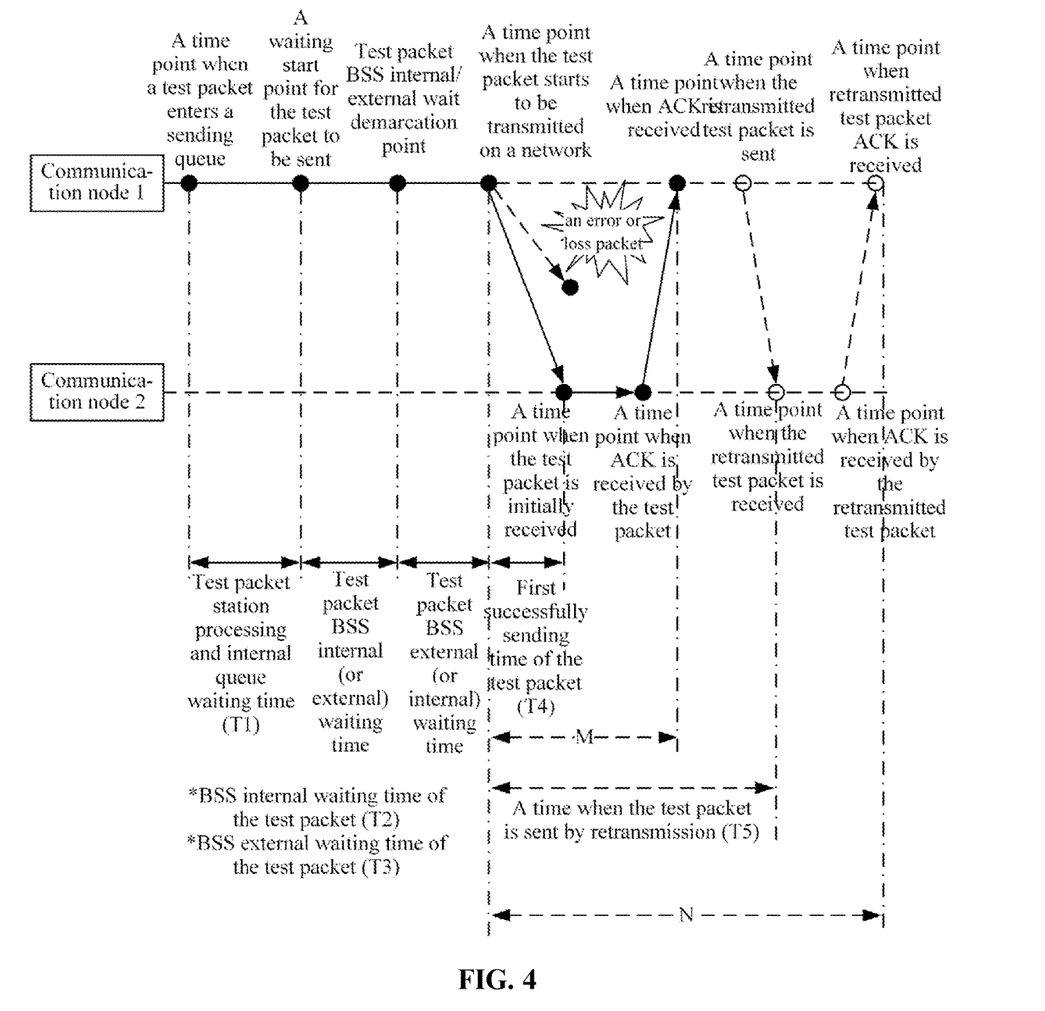
FIG. 4 is a schematic diagram of delay evaluation parameters according to an embodiment.

According to content of the delay performance evaluation, the delay performance is evaluated through measurement results of performance indicators such as transmission delay parameters. FIG. 4 is a schematic diagram of delay evaluation parameters according to an embodiment. The distribution of packet transmission time points between two communication nodes is shown in FIG. 4.

Test packet station processing and internal queue waiting time (represented by T1) is a time period between a time point when a test packet enters a sending queue and a waiting start point for the test packet to be sent and is mainly caused by a communication environment of the station within the BSS, which includes a processing time of the test packet, and/or a queuing time of the test packet from entering the queue to being dequeued, and/or a time for competing and waiting between internal queues.

BSS internal waiting time of the test packet (represented by T2) refers to a waiting time period during which another station in the BSS transmits data, where the waiting time period is within a time period between a time point when the test packet starts to be transmitted on a network and the waiting start point for the packet to be sent, that is, a time that the test packet waits to acquire a transmission opportunity (TXOP) through BSS internal contention or coordination, where the time is caused by the internal communication environment of the BSS.

BSS external waiting time of the test packet (represented by T3) refers to a waiting time period during which another communication node in the OBSS outside the BSS transmits data, where the waiting time period is within the time period between the time point when the test packet starts to be transmitted on the network and the waiting start point for the test packet to be sent, that is, a time for the test packet to wait for the OBSS station to release spectrum resources, where the time caused by an transmission interference of the OBSS outside the BSS.

A first successfully sending time of the test packet (represented by T4) is a time period between a time point when the test packet is initially received and the time point when the test packet starts to be transmitted on the network, that is, a time period when the test packet is successfully sent for the first time, where the time is a transmission time of the test packet in the network. The test packet is not interfered by other transmissions within the BSS during a transmission process, but is generated by the internal communication of the BSS.

A time when the test packet is sent through retransmission (represented by T5) is a time period between a time point when the retransmitted test packet is received and the time point when the test packet starts to be transmitted on the network and is caused by an error or loss of first sending of the test packet, where the time is mainly caused by an external interference environment of the BSS.

In this embodiment, T1, T2, T3, T4, and T5 may be defined as the transmission delay parameters.

Based on an analysis of factors generated by the preceding delays, to facilitate an evaluation of a low-delay service support capability, the delay evaluation parameters are divided into two parts: $T_{in}$ and $T_{out}$.

$T_{in}$ is a transmission delay caused by the internal communication environment of the BSS during a transmission process of the test packet and is referred to as a BSS internal delay or a test internal delay.

$T_{out}$ is a transmission delay caused by the external interference of the BSS during the transmission process of the test packet and is referred to as a BSS external delay or a test external delay.

In an embodiment, the test internal delay includes at least one of the following: the time period between the time point when the test packet enters the sending queue and the waiting start point for the test packet to be sent; the waiting time period during which the other communication node except the communication node in the BSS transmits data, where the waiting time period is within the time period between the time point when the test packet starts to be transmitted on the network and the waiting start point for the test packet to be sent; or the time period between the time point when the test packet is initially received and the time point when the test packet starts to be transmitted on the network. That is, the test internal delay includes at least one of T1, T2, or T4.

In an embodiment, the test external delay includes at least one of the following: a waiting time period during which another communication node in the OBSS outside the BSS transmits data, where the waiting time period is within the time period between the time point when the test packet starts to be transmitted on the network and the waiting start point for the test packet to be sent; or a time period between a time point when the retransmitted test packet is received and the time point when the test packet starts to be transmitted on the network in the case where initial transmission of the test packet fails. That is, the test external delay includes at least one of T3 or T5.

The composition of the test internal delay and the test external delay in different scenarios is described below.

In a first scenario, a time of transmitting the test packet on the network is considered.

In the case where the test packet station processing and internal queue waiting time is considered, $T_{in}$=T1+T2+T4; and in the case where the test packet station processing and internal queue waiting time is not considered, $T_{in}$=T2+T4; where T4=0 in the case where the initial transmission of the test packet fails.

$T_{out}$=T3+T5, where T5=0 in the case where the initial transmission of the test packet is successful, and T5 is a larger preset value if the test packet is lost.

In a second scenario, the time of transmitting the test packet on the network is not considered.

In the case where the test packet station processing and internal queue waiting time is considered, $T_{in}$=T1+T2; and in the case where the test packet station processing and internal queue waiting time is not considered, $T_{in}=T2$.

$T_{out}=T3$.

The following describes how to acquire T1, T2, T3, T4, and T5.

The communication node may acquire, through information such as a timer and/or duration of the received test packet, relevant transmission delay parameters generated by the communication node sending the test packet. For the transmission delay parameters of the test packet, the communication node starts timing from the time point when the test packet enters the sending queue, until ACKnowledgement (ACK) information is received from a receiving terminal of the test packet or it is determined that the test packet is lost, during which the time point when the test packet enters the sending queue, the waiting start point for the test packet to be sent, a starting point when the test packet starts to be transmitted on the network, and a time point when the ACK information is received from the receiving terminal of the test packet or a time point when the ACK information is received from the receiving terminal after the test packet is retransmitted.

The test packet station processing and internal queue waiting time, that is, T1, is a time difference between the waiting start point for the test packet to be sent and the time point when the test packet enters the sending queue.

In an embodiment, the first successfully sending time of the test packet, that is, T4, may be obtained by the time difference between the time point when the test packet is initially received and the time point when the test packet starts to be transmitted on the network. In another embodiment, in the case where a test packet receiver has feedback of an acknowledgement receipt message, T4 may be measured as a time difference between the time point when the ACK is received from the receiving terminal of the test packet and the starting point when the test packet starts to be transmitted on the network, that is, a time period represented by a line segment M in FIG. 4. That is, T4 may be determined by a time point when a test packet sender receives the acknowledgement receipt message of the test packet and the time point when the test packet starts to be transmitted on the network.

In an embodiment, the time when the test packet is sent through retransmission, that is, T5, may be obtained by a time difference between the time point when the retransmitted test packet is received and the time point when the test packet starts to be transmitted on the network. In another embodiment, in the case where a retransmitted test packet receiver has feedback of the acknowledgement receipt message, T5 may be measured as a time difference between a time point when transmitted test packet ACK sent by the receiving terminal after retransmission of the test packet is received and the starting point when the test packet starts to be transmitted on the network, that is, a time period represented by a line segment N in FIG. 4. That is, T5 may be determined by a time point when the test packet sender receives the acknowledgement receipt message after the retransmission of the test packet and the time point when the test packet starts to be transmitted on the network.

Figure 5:
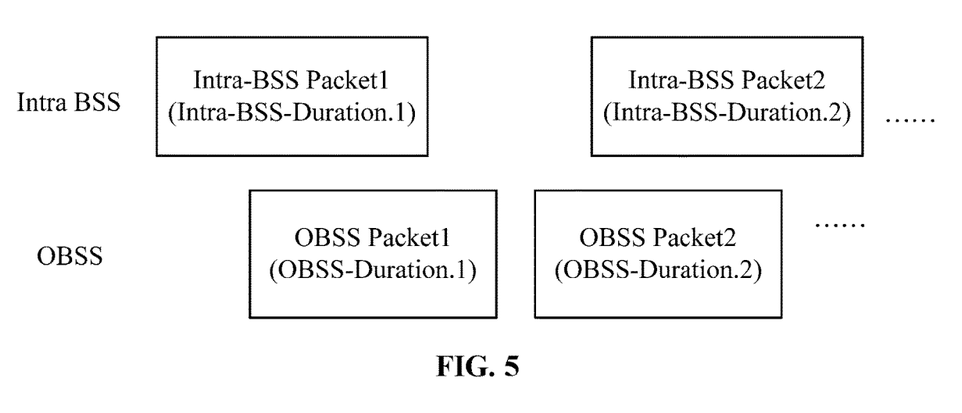
FIG. 5 is a schematic diagram of a BSS internal waiting time of a test packet and a BSS external waiting time of the test packet according to an embodiment.

The BSS internal waiting time of the test packet (that is, T2) and the BSS external waiting time of the test packet (that is, T3) are obtained through the methods described below. FIG. 5 is a schematic diagram of a BSS internal waiting time of a test packet and a BSS external waiting time of the test packet according to an embodiment. As shown in FIG. 5, through a time for receiving packets of an intra BSS and packets of an OBSS between the starting point when the test packet starts to be transmitted on the network and the waiting start point for the test packet to be sent and durations carried by the internal BSS packet and the OBSS packet, the communication node acquires T2 and T3.

$T2=T(\text{Intra-BSS-Duration.1})+T(\text{Intra-BSS-Duration.2})+ \ldots +T(\text{Intra-BSS-Duration.}M)$ $T3=T(\text{OBSS-Duration.1})+T(\text{OBSS-Duration.2})+ \ldots +T(\text{OBSS-Duration.}N)$ T(Intra-BSS-Duration. 1), T(Intra-BSS-Duration. 2), . . . , and T(Intra-BSS-Duration.M) refer to time lengths corresponding to durations of a packet 1, a packet 2, . . . , and a packet M in the BSS received between the time point when the test packet starts to be transmitted on the network and the waiting start point for the test packet to be sent.

T(OBSS-Duration. 1), T(OBSS-Duration.2), . . . , and T(OBSS-Duration.N) refer to time lengths corresponding to durations of the packet 1, the packet 2, . . . , and a packet N of the OBSS received between the time point when the test packet starts to be transmitted on the network and the waiting start point for the test packet to be sent.

To sum up, the communication node determines a sum of time lengths corresponding to transmission durations of received internal packets of the BSS in the time period between the time point when the test packet starts to be transmitted on the network and the waiting start point for the test packet to be sent to be the waiting time period during which the other communication node except the communication node in the BSS transmits data, where the waiting time period is within the time period between the time point when the test packet starts to be transmitted on the network and the waiting start point for the test packet to be sent.

The communication node determines a sum of time lengths corresponding to transmission durations of received packets of the OBSS in the time period between the time point when the test packet starts to be transmitted on the network and the waiting start point for the test packet to be sent to be the waiting time period during which the communication node in the OBSS outside the BSS transmits data, where the waiting time period is within the time period between the time point when the test packet starts to be transmitted on the network and the waiting start point for the test packet to be sent.

In an embodiment, the test internal delay includes a test uplink internal delay and a test downlink internal delay.

In an embodiment, the test external delay includes a test uplink external delay and a test downlink external delay.

In an embodiment, in a scenario where the communication node is an access point, before 302 and 303, the method further includes the following: according to a process of sending each test packet, determining, by the communication node, a test downlink internal delay and a test downlink external delay of each test packet; and receiving, by the communication node, a test uplink internal delay and a test uplink external delay from a station.

In other words, assuming that the communication node in this embodiment is an access point, the access point may acquire corresponding T1, T2, T3, T4, and T5 according to the method described above and then determine the test downlink internal delay and the test downlink external delay. The station may acquire corresponding T1, T2, T3, T4, and T5 according to the method described above and then determine the test uplink internal delay and the test uplink external delay. In this embodiment, multiple test packets exist. Therefore, the communication node may determine multiple test downlink internal delays and multiple test downlink external delays and receive multiple test uplink internal delays and test uplink external delays.

In an embodiment, in a scenario where the communication node is a station, before 302 and 303, the method further includes the following: according to a process of sending each test packet, determining, by the communication node, a test uplink internal delay and a test uplink external delay of each test packet; and receiving, by the communication node, a test downlink internal delay and a test downlink external delay from an access point.

In other words, assuming that the communication node in this embodiment is a station, the station may acquire corresponding T1, T2, T3, T4, and T5 according to the method described above and then determine the test uplink internal delay and the test uplink external delay. The access point may acquire corresponding T1, T2, T3, T4, and T5 according to the method described above and then determine the test downlink internal delay and the test downlink external delay. In this embodiment, multiple test packets exist. Therefore, the communication node may determine multiple test downlink internal delays and multiple test downlink external delays and receive multiple test uplink internal delays and test uplink external delays.

In an embodiment, the delay performance evaluation may be initiated by the access point, or the station may send a delay performance evaluation request to the access point and the access point may determine the delay performance evaluation and initiate the evaluation, or the station may directly initiate the delay performance evaluation.

The communication node, as an initiator or executor of the delay performance evaluation, evaluates the delay performance according to downlink and/or uplink delay evaluation parameters (including T1, T2, T3, T4, or T5, and/or $T_{in}$ and $T_{out}$). Uplink delay evaluation parameters may be acquired by the station and then reported to the access point, and downlink delay evaluation parameters may be acquired by the access point and then sent to the station.

In an embodiment, before 101, 102, 302, and 303, the method further includes the following: receiving, by the communication node, a delay performance evaluation request.

In an embodiment, the first preset condition includes a first uplink preset condition and a first downlink preset condition. Determining the internal communication environment to be the main factor affecting the delay includes in the case where the communication node determines that multiple pre-acquired test uplink internal delays and the pre-acquired maximum uplink delay satisfy the first uplink preset condition, determining the internal communication environment to be a main factor affecting an uplink delay; and in the case where the communication node determines that multiple pre-acquired test downlink internal delays and the pre-acquired maximum downlink delay satisfy the first downlink preset condition, determining the internal communication environment to be a main factor affecting a downlink delay.

The first uplink preset condition is that a maximum value of the multiple test uplink internal delays is greater than a product of a first preset value and the maximum uplink delay, or an average value of the multiple test uplink internal delays is greater than a product of a first preset value and the maximum uplink delay; where the first preset value is greater than 0 and less than or equal to 1. The first downlink preset condition is that a maximum value of the multiple test downlink internal delays is greater than a product of the first preset value and the maximum downlink delay, or an average value of the multiple test downlink internal delays is greater than a product of the first preset value and the maximum downlink delay.

In an embodiment, the second preset condition includes a second uplink preset condition and a second downlink preset condition. Determining the external communication environment to be the main factor affecting the delay includes in the case where the communication node determines that multiple pre-acquired test uplink external delays and the pre-acquired maximum uplink delay satisfy the second uplink preset condition, determining the external communication environment to be a main factor affecting an uplink delay; and in the case where the communication node determines that multiple pre-acquired test downlink external delays and the pre-acquired maximum downlink delay satisfy the second downlink preset condition, determining the external communication environment to be a main factor affecting a downlink delay.

The second uplink preset condition is that a maximum value of the multiple test uplink external delays is greater than a product of a second preset value and the maximum uplink delay, or an average value of the multiple test uplink external delays is greater than a product of a second preset value and the maximum uplink delay; where the second preset value is greater than 0 and less than or equal to 1. The second downlink preset condition is that a maximum value of the multiple test downlink external delays is greater than a product of the second preset value and the maximum downlink delay, or an average value of the multiple test downlink external delays is greater than a product of the second preset value and the maximum downlink delay.

The following describes an implementation process of determining the internal communication environment to be the main factor affecting the delay and determining the external communication environment to be the main factor affecting the delay.

With continued reference to FIG. 4, in the case where a communication node 1 is an access point and a communication node 2 is a station, FIG. 4 shows a time point distribution of downlink (a direction from an AP to a non-AP STA) transmission, the BSS internal delay, that is, the test internal delay $T_{in}$ is marked as $T_{in\ downlink}$, and the BSS external delay, that is, the test external delay $T_{out}$ is marked as $T_{out\ downlink}$.

In the case where the communication node 1 is the station and the communication node 2 is the access point, FIG. 4 shows a time point distribution of uplink (a direction from a non-AP STA to an AP) transmission, the BSS internal delay, that is, the test internal delay $T_{in}$ is marked as $T_{in\ uplink}$, and the BSS external delay, that is, the test external delay $T_{out}$ is marked as $T_{out\ uplink}$.

According to the delay indication of the service to be transmitted, the delay performance in the current communication environment of WI-FI is evaluated by using $T_{in\ downlink}$, $T_{in\ uplink}$, $T_{out\ downlink}$ and $T_{out\ uplink}$. It is assumed that the delay indication of the service to be transmitted is represented as: the maximum downlink delay is $T_{downlink\ max}$, and the maximum uplink delay is $T_{uplink\ max}$. The BSS internal delays $T_{in}$ of a test packet 1, . . . , and a test packet n in a downlink direction obtained by measurement are respectively represented as $T_{in\ downlink\text{-}1}$, $T_{in\ downlink\text{-}2}$, . . . , and $T_{in\ downlink\text{-}n}$. The BSS external delays $T_{out}$ of the test packet 1, . . . , and the test packet n are respectively represented as $T_{out\ downlink\text{-}1}$, $T_{out\ downlink\text{-}2}$, . . . , and $T_{out\ downlink\text{-}n}$. The BSS internal delays $T_{in}$ of the test packet 1, . . . , and the test packet n in an uplink direction are respectively represented as $T_{in\ uplink-1}$, $T_{in\ uplink-2}$, . . . , and $T_{in\ uplink-n}$. The BSS external delays $T_{out}$ of the test packet 1, . . . , and the test packet n are respectively represented as $T_{out\ uplink-1}$, $T_{out\ uplink-2}$, . . . , and $T_{out\ uplink-n}$. It is assumed that a represents the first preset value and b represents the second preset value. A value of a is greater than 0 and less than or equal to 1, and a value of b is greater than 0 and less than or equal to 1. The evaluation methods are as follows.

In a first method, evaluation is performed through a maximum transmission delay of the test packet.

(1) In the case where $\max(T_{in\ downlink-1}, T_{in\ downlink-2}, \ldots, \text{and } T_{in\ downlink-n}) > a \cdot T_{downlink\ max}$, it indicates that busyness of the internal communication environment of the BSS is the main factor affecting the downlink delay, where $\max(T_{in\ downlink-1}, T_{in\ downlink-2}, \ldots, T_{in\ downlink-n})$ represents a maximum value among $T_{in\ downlink-1}, T_{in\ downlink-2}, \ldots,$ and $T_{in\ downlink-n}$, and the following is similar; that is, the first downlink preset condition is: the maximum value of the multiple test downlink internal delays is greater than the product of the first preset value and the maximum downlink delay.

(2) In the case where $\max(T_{out\ downlink-1}, T_{out\ downlink-2}, \ldots, \text{and } T_{out\ downlink-n}) > b \cdot T_{downlink\ max}$, it indicates that interference of external factors of the BSS is the main factor affecting the downlink delay; that is, the second downlink preset condition is: the maximum value of the multiple test downlink external delays is greater than the product of the second preset value and the maximum downlink delay.

(3) In the case where $\max(T_{in\ uplink-1}, T_{in\ uplink-2}, \ldots, \text{and } T_{in\ uplink-n}) > a \cdot T_{uplink\ max}$, it indicates that the busyness of the internal communication environment of the BSS is the main factor affecting the uplink delay; that is, the first uplink preset condition is: the maximum value of the multiple test uplink internal delays is greater than the product of the first preset value and the maximum uplink delay.

(4) In the case where $\max(T_{out\ uplink-1}, T_{out\ uplink-2}, \ldots, \text{and } T_{out\ uplink-0}) > b\ T\ uplink\ max$, it indicates that the interference of external factors of the BSS is the main factor affecting the uplink delay; that is, the second uplink preset condition is: the maximum value of the multiple test uplink external delays is greater than the product of the second preset value and the maximum uplink delay.

In a second method, evaluation is performed through an average transmission delay of the test packet.

(1) In the case where $\operatorname{avg}(T_{in\ downlink-1}, T_{in\ downlink-2}, \ldots, T_{in\ downlink-n}) > a \cdot T_{downlink\ max}$, it indicates that the busyness of the internal communication environment of the BSS is the main factor affecting the downlink delay, where $\operatorname{avg}(T_{in\ downlink-1}, T_{in\ downlink-2}, \ldots, T_{in\ downlink-n})$ represents an average value among $T_{in\ downlink-1}, T_{in\ downlink-2}, \ldots,$ and $T_{in\ downlink-n}$, and the following is similar; that is, the first downlink preset condition is: the average value of the multiple test downlink internal delays is greater than the product of the first preset value and the maximum downlink delay.

(2) In the case where $\operatorname{avg}(T_{out\ downlink-1}, T_{out\ downlink-2}, \ldots, T_{out\ downlink-n}) > b \cdot T_{downlink\ max}$, it indicates that the interference of external factors of the BSS is the main factor affecting the downlink delay; that is, the second downlink preset condition is: the average value of the multiple test downlink external delays is greater than the product of the second preset value and the maximum downlink delay.

(3) In the case where $\operatorname{avg}(T_{in\ uplink-1}, T_{in\ uplink-2}, \ldots, T_{in\ uplink-n}) > a \cdot T_{uplink\ max}$, it indicates that the busyness of the internal communication environment of the BSS is the main factor affecting the uplink delay; that is, the first uplink preset condition is: the average value of the multiple test uplink internal delays is greater than the product of the first preset value and the maximum uplink delay.

(4) In the case where $\operatorname{avg}(T^{out\ uplink-1}, T_{out\ uplink-2}, \ldots, T_{out\ uplink-n}) > b \cdot T_{uplink\ max}$, it indicates that the interference of external factors of the BSS is the main factor affecting the uplink delay; that is, the second uplink preset condition is: the average value of the multiple test uplink external delays is greater than the product of the second preset value and the maximum uplink delay.

In an embodiment, it is also feasible that according to the delay indication of the service to be transmitted, a support capability of the service to be transmitted in the current communication environment of WI-FI is evaluated by using $T_{in}$ downlink, $T_{in\ uplink}$, $T_{out\ downlink}$, and $T_{out\ uplink}$. Evaluation may also be performed through the two methods described below.

In a first method, evaluation is performed by using a maximum value of the sum of the test uplink internal delay and the test uplink external delay corresponding to a same test packet among multiple test packets.

(1) In the case where $\max(T_{in\ uplink-1}+T_{out\ uplink-1}, T_{in\ uplink-2}+T_{out\ uplink-2}, \ldots, T_{in\ uplink-n}+T_{out\ uplink-n}) > T_{uplink\ max}$, it indicates that the current communication environment does not satisfy a maximum uplink delay requirement of the service to be transmitted.

(2) In the case where $\max(T_{in\ downlink-1}+T_{out\ downlink-1}, T_{in\ downlink-2}+T_{out\ downlink-2}, \ldots, T_{in\ downlink-n}+T_{out\ downlink-n}) > T_{downlink\ max}$, it indicates that the current communication environment does not satisfy a maximum downlink delay requirement of the service to be transmitted.

In a second method, evaluation is performed by using an average value of the sum of the test uplink internal delay and the test uplink external delay corresponding to a same test packet among the multiple test packets.

(1) In the case where $\operatorname{avg}(T_{in\ uplink-1}+T_{out\ uplink-1}, T_{in\ uplink-2}+T_{out\ uplink-2}, \ldots, T_{in\ uplink-n}+T_{out\ uplink-n}) > T_{uplink\ max}$, it indicates that the current communication environment does not satisfy the maximum uplink delay requirement of the service to be transmitted.

(2) In the case where $\operatorname{avg}(T_{in\ downlink-1}+T_{out\ downlink-1}, T_{in\ downlink-2}+T_{out\ downlink-2}, \ldots, T_{in\ downlink-n}+T_{out\ downlink-n}) > T_{downlink\ max}$, it indicates that the current communication environment does not satisfy the maximum downlink delay requirement of the service to be transmitted.

That is, in the case where it is determined that the maximum value or the average value of the sum of the test uplink internal delay and the test uplink external delay corresponding to a same test packet among the multiple test packets is greater than the maximum uplink delay, the communication node determines the current communication environment does not satisfy the maximum uplink delay of the service to be transmitted; and in the case where it is determined that a maximum value or an average value of a sum of the test downlink internal delay and the test downlink external delay corresponding to a same test packet among the multiple test packets is greater than the maximum downlink delay, the communication node determines that the current communication environment does not satisfy the maximum downlink delay of the service to be transmitted.

A sum $T_{in\ uplink}+T_{out\ uplink}$ of the test uplink internal delay and the test uplink external delay corresponding to each test packet among the multiple test packets may be calculated. The number of the test packets is the same as the number of sums of the test uplink internal delays and the test uplink external delays. In the case where a maximum value or an average value of these sums is greater than the maximum uplink delay of the service to be transmitted, the communication node determines that the current communication environment does not satisfy the maximum uplink delay of the service to be transmitted.

Similarly, a sum ($T_{in\ downlink}+T_{out\ downlink}$) of the test downlink internal delay and the test downlink external delay corresponding to each test packet among the multiple test packets may be calculated. The number of the test packets is the same as the number of sums of the test downlink internal delays and the test downlink external delays. In the case where a maximum value or an average value of these sums is greater than the maximum downlink delay of the service to be transmitted, the communication node determines that the current communication environment does not satisfy the maximum downlink delay of the service to be transmitted.

It is to be understood that, in the case where the communication node determines that the current communication environment does not satisfy the maximum uplink delay of the service to be transmitted, or in the case where the communication node determines that the current communication environment does not satisfy the maximum downlink delay of the service to be transmitted, it is determined that the current communication environment cannot achieve access to the service to be transmitted.

In view of a problem that WI-FI communicates in an unlicensed spectrum environment and adopts a contention-based access method, which makes it difficult to determine a communication performance, in the present application, the delay performance of the external environment of the current BSS communication of WI-FI and the delay performance of the internal communication environment of the BSS are evaluated so as to analyze whether the current WI-FI environment may support low-delay services and the main factor that cause the increase of a communication delay. The present application has values for the evolution and development of WI-FI technology and in the aspect of carrying new services.

This embodiment provides a delay performance evaluation method. The delay performance evaluation method includes acquiring, by a communication node, a delay indication of a service to be transmitted, evaluating, by the communication node, a delay performance involved in an internal communication environment of a BSS according to pre-acquired delay evaluation parameters caused by internal communication contention or control of the BSS where the communication node is located and the delay indication of the service to be transmitted, and evaluating, by the communication node, a delay performance involved in an external interference of the BSS according to pre-acquired delay evaluation parameters caused by the external interference of the BSS and the delay indication of the service to be transmitted, so as to provide an evaluation basis for adjustment and optimization of service access strategies and methods, thereby achieving access to low-delay services.

Figure 6:
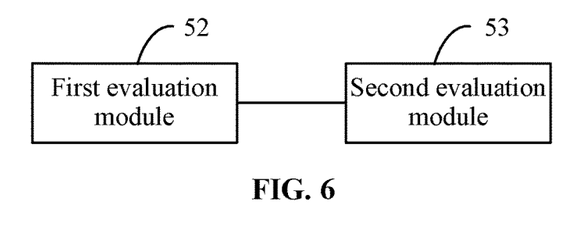
FIG. 6 is a structural diagram of a delay performance evaluation apparatus according to an embodiment.

FIG. 6 is a structural diagram of a delay performance evaluation apparatus according to an embodiment. The delay performance evaluation apparatus may be set in the communication node. As shown in FIG. 6, the delay performance evaluation apparatus provided in this embodiment includes the following modules: a first evaluation module 52 and/or a second evaluation module 53.

The first evaluation module 52 is configured to evaluate a delay performance involved in an internal communication environment of the BSS where the communication node is located according to pre-acquired delay evaluation parameters caused by internal communication contention or control of the BSS.

The second evaluation module 53 is configured to evaluate a delay performance involved in an external interference of a BSS where the communication node is located according to pre-acquired delay evaluation parameters caused by the external interference of the BSS.

Optionally, the apparatus further includes an acquisition module configured to acquire a delay indication of a service to be transmitted.

Correspondingly, the first evaluation module 52 is configured to evaluate a delay performance involved in an internal communication environment of the BSS according to pre-acquired delay evaluation parameters caused by internal communication contention or control of the BSS where the communication node is located and the delay indication of the service to be transmitted. The second evaluation module 53 is configured to evaluate a delay performance involved in an external interference of a BSS according to pre-acquired delay evaluation parameters caused by the external interference of the BSS and the delay indication of the service to be transmitted.

In an embodiment, the delay evaluation parameters caused by the internal communication contention or control of the BSS include multiple test internal delays. Correspondingly, the first evaluation module 52 is configured to, in the case where it is determined that the multiple pre-acquired test internal delays and the delay indication satisfy a first preset condition, determine the internal communication environment to be a main factor affecting a delay.

In an embodiment, the delay evaluation parameters caused by the external interference of the BSS include multiple test external delays. Correspondingly, the second evaluation module 53 is configured to, in the case where it is determined that the multiple pre-acquired test external delays and the delay indication satisfy a second preset condition, determine the external factor to be a main factor affecting the delay.

In an embodiment, the test internal delay includes at least one of the following: the time period between the time point when the test packet enters the sending queue and the waiting start point for the test packet to be sent; a waiting time period during which another communication node except the communication node in the BSS where the communication node is located transmits data, where the waiting time period is within the time period between the time point when the test packet starts to be transmitted on the network and the waiting start point for the test packet to be sent; or the time period between the time point when the test packet is initially received and the time point when the test packet starts to be transmitted on the network.

In an embodiment, the test external delay includes at least one of the following: a waiting time period during which another communication node in the OBSS outside the BSS transmits data, where the waiting time period is within the time period between the time point when the test packet starts to be transmitted on the network and the waiting start point for the test packet to be sent; or a time period between a time point when the retransmitted test packet is received and the time point when the test packet starts to be transmitted on the network in the case where initial transmission of the test packet fails.

In an embodiment, the delay indication includes a maximum downlink delay and a maximum uplink delay. The test internal delay includes a test uplink internal delay and a test downlink internal delay. The test external delay includes a test uplink external delay and a test downlink external delay.

In an embodiment, the first preset condition includes a first uplink preset condition and a first downlink preset condition. In an aspect of determining the internal communication environment to be the main factor affecting the delay, the first evaluation module 52 is configured to, in the case where it is determined that multiple pre-acquired test uplink internal delays and the pre-acquired maximum uplink delay satisfy the first uplink preset condition, determine the internal communication environment to be a main factor affecting an uplink delay; and in the case where it is determined that multiple pre-acquired test downlink internal delays and the pre-acquired maximum downlink delay satisfy the first downlink preset condition, determine the internal communication environment to be a main factor affecting a downlink delay.

In an embodiment, the second preset condition includes a second uplink preset condition and a second downlink preset condition. In an aspect of determining the external communication environment to be the main factor affecting the delay, the second evaluation module 53 is configured to, in the case where it is determined that multiple pre-acquired test uplink external delays and the pre-acquired maximum uplink delay satisfy the second uplink preset condition, determine the external communication environment to be a main factor affecting an uplink delay; and in the case where it is determined that multiple pre-acquired test downlink external delays and the pre-acquired maximum downlink delay satisfy the second downlink preset condition, determine the external communication environment to be a main factor affecting a downlink delay.

In an embodiment, the first uplink preset condition is that a maximum value of the multiple test uplink internal delays is greater than a product of the first preset value and the maximum uplink delay, or an average value of the multiple test uplink internal delays is greater than a product of the first preset value and the maximum uplink delay. The first preset value is greater than 0 and less than or equal to 1.

The first downlink preset condition is that a maximum value of the multiple test downlink internal delays is greater than a product of the first preset value and the maximum downlink delay, or an average value of the multiple test downlink internal delays is greater than a product of the first preset value and the maximum downlink delay.

In an embodiment, the second uplink preset condition is that a maximum value of the multiple test uplink external delays is greater than a product of a second preset value and the maximum uplink delay, or an average value of the multiple test uplink external delays is greater than a product of a second preset value and the maximum uplink delay; where the second preset value is greater than 0 and less than or equal to 1.

The second downlink preset condition is that a maximum value of the multiple test downlink external delays is greater than a product of the second preset value and the maximum downlink delay, or an average value of the multiple test downlink external delays is greater than a product of the second preset value and the maximum downlink delay.

Optionally, the apparatus further includes a receiving module configured to receive a delay performance evaluation request.

In an embodiment, in a scenario where the communication node is an access point, the apparatus further includes a first determination module.

The first determination module is configured to, according to a process of sending each test packet, determine a test downlink internal delay and a test downlink external delay of each test packet.

The receiving module is further configured to receive a test uplink internal delay and a test uplink external delay from a station.

In an embodiment, in a scenario where the communication node is a station, the apparatus further includes a second determination module.

The second determination module is configured to, according to a process of sending each test packet, determine a test uplink internal delay and a test uplink external delay of each test packet.

The receiving module is configured to receive a test downlink internal delay and a test downlink external delay from an access point.

Optionally, the apparatus further includes a third determination module and a fourth determination module.

The third determination module is configured to determine a sum of time lengths corresponding to transmission durations of received internal packets of the BSS in the time period between the time point when the test packet starts to be transmitted on the network and the waiting start point for the test packet to be sent to be the waiting time period during which the other communication node except the communication node in the BSS transmits data, where the waiting time period is within the time period between the time point when the test packet starts to be transmitted on the network and the waiting start point for the test packet to be sent.

The fourth determination module is configured to determine a sum of time lengths corresponding to transmission durations of received packets of the OBSS in the time period between the time point when the test packet starts to be transmitted on the network and the waiting start point for the test packet to be sent to be the waiting time period during which the communication node in the OBSS outside the BSS transmits data, where the waiting time period is within the time period between the time point when the test packet starts to be transmitted on the network and the waiting start point for the test packet to be sent.

Optionally, the apparatus further includes a fifth determination module and a sixth determination module.

The fifth determination module is configured to, in the case where a maximum value or an average value of a sum of the test uplink internal delay and the test uplink external delay corresponding to a same test packet among multiple test packets is greater than the maximum uplink delay, determine that a current communication environment does not satisfy the maximum uplink delay of the service to be transmitted.

The sixth determination module is configured to, in the case where a maximum value or an average value of a sum of the test downlink internal delay and the test downlink external delay corresponding to a same test packet among multiple test packets is greater than the maximum downlink delay, determine that a current communication environment does not satisfy the maximum downlink delay of the service to be transmitted.

The delay performance evaluation apparatus provided in this embodiment is configured to implement the delay performance evaluation method in the embodiments shown in FIGS. 1 and 3. An implementation principle of the delay performance evaluation apparatus provided in this embodiment is similar, and details are not repeated here.

Figure 7:
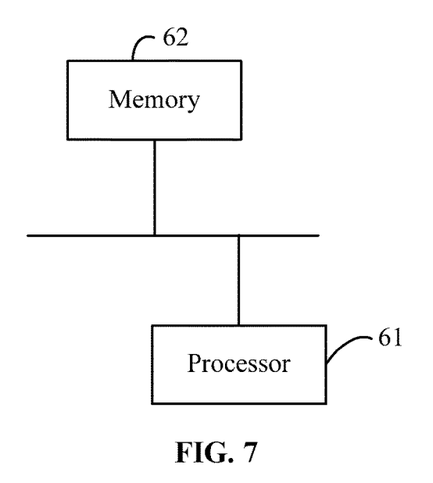
FIG. 7 is a structural diagram of a delay performance evaluation apparatus according to another embodiment.

FIG. 7 is a structural diagram of a delay performance evaluation apparatus according to another embodiment. As shown in FIG. 7, the delay performance evaluation apparatus includes a processor 61. Optionally, the delay performance evaluation apparatus further includes a memory 62. The delay performance evaluation apparatus may include one or more processors 61. One processor 61 is shown as an example in FIG. 7. The processor 61 and the memory 62 in the delay performance evaluation apparatus may be connected via a bus or in other manners. The connection via the bus is shown as an example in FIG. 7.

As a computer-readable storage medium, the memory 62 may be configured to store software programs, computer-executable programs, and modules, such as program instructions/modules corresponding to the delay performance evaluation method in the embodiment of FIG. 1 of the present application (for example, the first evaluation module 52 and the second evaluation module 53 in the delay performance evaluation apparatus). The processor 61 executes various functional applications and data processing of the delay performance evaluation apparatus by running the software programs, instructions, and modules stored in the memory 62, that is, achieves the delay performance evaluation method in FIG. 1 and each optional embodiment.

The memory 62 may mainly include a program storage region and a data storage region. The program storage region may store an operating system and an application program required by at least one function. The data storage region may store data created according to the use of the delay performance evaluation apparatus. The memory 62 may include a high-speed random-access memory and may also include a non-volatile memory such as at least one disk memory, a flash memory device or another non-volatile solid-state memory.

The delay performance evaluation apparatus shown in FIG. 7 may be an access point or a station in a WLAN or may be set in an access point or a station.

An embodiment of the present application further provides a storage medium including a computer-executable instruction. When executed by a processor of a computer, the computer-executable instruction is used for causing the processor to perform the delay performance evaluation method according to any of the embodiments of the present application.

The preceding are only example embodiments of the present application and are not intended to limit the scope of the present application.

It is to be understood by those skilled in the art that the term "user terminal" covers any suitable type of radio UE, for example, a mobile phone, a portable data processing device, a portable web browser, or a vehicle-mounted mobile station.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, though the present application is not limited thereto.

Embodiments of the present application may be implemented by computer program instructions executed by a data processor of a mobile apparatus, for example, in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in a memory. The memory may be of any type suitable to the local technical environment and may be implemented using any suitable data storage technology such as, but not limited to, a read-only memory (ROM), a random-access memory (RAM), an optical memory device and system (a digital video disc (DVD) or a compact disc (CD)), and the like. Computer-readable media may include non-transitory storage media. The data processor may be of any type suitable to the local technical environment, such as, but is not limited to, a general-purpose computer, a special-purpose computer, a microprocessor, a digital signal processor (DSP), an application specific integrated circuit (ASIC), a field-programmable gate array (FPGA), and a processor based on a multi-core processor architecture.

What is claimed is:

1. A delay performance evaluation method, comprising at least one of the following:

evaluating, by a communication node, a delay performance involved in an internal communication environment of a basic service set (BSS) where the communication node is located according to pre-acquired delay evaluation parameters caused by internal communication contention or control of the BSS; or evaluating, by a communication node, a delay performance involved in an external interference of a BSS where the communication node is located according to pre-acquired delay evaluation parameters caused by the external interference of the BSS, wherein before the communication node evaluates the delay performance involved in the internal communication environment of the BSS where the communication node is located according to the pre-acquired delay evaluation parameters caused by the internal communication contention or control of the BSS, the method further comprises:

acquiring, by the communication node, a delay indication of a service to be transmitted;

wherein the delay evaluation parameters caused by the internal communication contention or control of the BSS comprises a plurality of pre-acquired test internal delays; and evaluating, by the communication node, the delay performance involved in the internal communication environment of the BSS where the communication node is located according to the pre-acquired delay evaluation parameters caused by the internal communication contention or control of the BSS comprises:

in a case where the communication node determines that the plurality of pre-acquired test internal delays and the delay indication satisfy a first preset condition, determining the internal communication environment to be a main factor affecting a delay;

wherein the delay evaluation parameters caused by the external interference of the BSS comprises a plurality of pre-acquired test external delays; and evaluating, by the communication node, the delay performance involved in the external interference of the BSS where the communication node is located according to the pre-acquired delay evaluation parameters caused by the external interference of the BSS comprises:

in a case where the communication node determines that the plurality of pre-acquired test external delays and the delay indication satisfy a second preset condition, determining an external communication environment to be a main factor affecting the delay performance;

wherein the delay indication comprises a maximum downlink delay and a maximum uplink delay;

each of the plurality of pre-acquired test internal delays comprises a pre-acquired test uplink internal delay and a pre-acquired test downlink internal delay; and each of the plurality of pre-acquired test external delays comprises a pre-acquired test uplink external delay and a pre-acquired test downlink external delay; and for a plurality of test packets determined by the communication node, in a case where a maximum value or an average value of sums including a sum of the test uplink internal delay and the test uplink external delay corresponding to a same test packet is greater than the maximum uplink delay, determining, by the communication node, that a current communication environment fails to satisfy a maximum uplink delay of the service to be transmitted; and for the plurality of test packets determined by the communication node, in a case where a maximum value or an average value of sums including a sum of the test downlink internal delay and the test downlink external delay corresponding to a same test packet is greater than the maximum downlink delay, determining, by the communication node, that the current communication environment fails to satisfy a maximum downlink delay of the service to be transmitted.

2. The method of claim 1, wherein the plurality of pre-acquired test internal delays comprise at least one of the following:

a time period between a time point when a test packet enters a sending queue and a waiting start point for the test packet to be sent;

a first waiting time period during which another communication node except the communication node in the BSS transmits data, wherein the waiting time period is within a time period between a time point when the test packet starts to be transmitted on a network and the waiting start point for the test packet to be sent; or a time period between a time point when the test packet is initially received and the time point when the test packet starts to be transmitted on the network.

3. The method of claim 2, wherein a plurality of test external delays comprise at least one of the following:

a second waiting time period during which a communication node in an overlapping basic service set (OBSS) outside the BSS transmits data, wherein the waiting time period is within the time period between the time point when the test packet starts to be transmitted on the network and the waiting start point for the test packet to be sent; or a time period between a time point when a retransmitted test packet is received and the time point when the test packet starts to be transmitted on the network in a case where initial transmission of the test packet fails.

4. The method of claim 1, wherein the first preset condition comprises a first uplink preset condition and a first downlink preset condition;

wherein determining the internal communication environment to be the main factor affecting the delay comprises:

in a case where the communication node determines that the plurality of pre-acquired test uplink internal delays and the maximum uplink delay satisfy the first uplink preset condition, determining the internal communication environment to be a main factor affecting an uplink delay; and in a case where the communication node determines that the plurality of pre-acquired test downlink internal delays and the maximum downlink delay satisfy the first downlink preset condition, determining the internal communication environment to be a main factor affecting a downlink delay.

5. The method of claim 1, wherein the second preset condition comprises a second uplink preset condition and a second downlink preset condition;

wherein determining the external communication environment to be the main factor affecting the delay comprises:

in a case where the communication node determines that the plurality of pre-acquired test uplink external delays and the maximum uplink delay satisfy the second uplink preset condition, determining the external communication environment to be a main factor affecting an uplink delay; and in a case where the communication node determines that the plurality of pre-acquired test downlink external delays and the maximum downlink delay satisfy the second downlink preset condition, determining the external communication environment to be a main factor affecting a downlink delay.

6. The method of claim 4, wherein the first uplink preset condition is that a maximum value of the plurality of pre-acquired test uplink internal delays is greater than a product of a first preset value and the maximum uplink delay, or an average value of the plurality of pre-acquired test uplink internal delays is greater than a product of a first preset value and the maximum uplink delay; wherein the first preset value is greater than 0 and less than or equal to 1; and the first downlink preset condition is that a maximum value of the plurality of pre-acquired test downlink internal delays is greater than a product of the first preset value and the maximum downlink delay, or an average value of the plurality of pre-acquired test downlink internal delays is greater than a product of the first preset value and the maximum downlink delay.

7. The method of claim 5, wherein the second uplink preset condition is that a maximum value of the plurality of pre-acquired test uplink external delays is greater than a product of a second preset value and the maximum uplink delay, or an average value of the plurality of pre-acquired test uplink external delays is greater than a product of a second preset value and the maximum uplink delay; wherein the second preset value is greater than 0 and less than or equal to 1; and the second downlink preset condition is that a maximum value of the plurality of pre-acquired test downlink external delays is greater than a product of the second preset value and the maximum downlink delay, or an average value of the plurality of pre-acquired test downlink external delays is greater than a product of the second preset value and the maximum downlink delay.

8. The method of claim 1, further comprising:

receiving, by the communication node, a delay performance evaluation request.

9. The method of claim 1, wherein in a case where the communication node is an access point, before determining the internal communication environment to be the main factor affecting the delay or before determining the external communication environment to be the main factor affecting the delay, the method further comprises:
    according to a process of sending each test packet, determining, by the communication node, a test downlink internal delay and a test downlink external delay of each test packet; and
    receiving, by the communication node, a test uplink internal delay and a test uplink external delay from a station.

10. The method of claim 1, wherein in a case where the communication node is a station, before determining the internal communication environment to be the main factor affecting the delay or before determining the external communication environment to be the main factor affecting the delay, the method further comprises:
    according to a process of sending each test packet, determining, by the communication node, a test uplink internal delay and a test uplink external delay of each test packet; and
    receiving, by the communication node, a test downlink internal delay and a test downlink external delay from an access point.

11. The method of claim 3, wherein before determining the internal communication environment to be the main factor affecting the delay or before determining an external communication environment to be a main factor affecting the delay, the method further comprises:
    determining, by the communication node, a sum of time lengths corresponding to transmission durations of received internal packets of the BSS in the time period between the time point when the test packet starts to be transmitted on the network and the waiting start point for the test packet to be sent to be the first waiting time period; and
    determining, by the communication node, a sum of time lengths corresponding to transmission durations of received packets of the OBSS in the time period between the time point when the test packet starts to be transmitted on the network and the waiting start point for the test packet to be sent to be the second waiting time period.

12. A delay performance evaluation apparatus, comprising a processor;
    wherein the processor is configured to, when executing computer programs, perform a delay performance evaluation method, comprising:
    evaluating, by a communication node, a delay performance involved in an internal communication environment of a basic service set (BSS) where the communication node is located according to pre-acquired delay evaluation parameters caused by internal communication contention or control of the BSS; or
    evaluating, by a communication node, a delay performance involved in an external interference of a BSS where the communication node is located according to pre-acquired delay evaluation parameters caused by the external interference of the BSS,
    wherein before the communication node evaluates the delay performance involved in the internal communication environment of the BSS where the communication node is located according to the pre-acquired delay evaluation parameters caused by the internal communication contention or control of the BSS, the method further comprises:
    acquiring, by the communication node, a delay indication of a service to be transmitted;
    wherein the delay evaluation parameters caused by the internal communication contention or control of the BSS comprises a plurality of pre-acquired test internal delays; and
    evaluating, by the communication node, the delay performance involved in the internal communication environment of the BSS where the communication node is located according to the pre-acquired delay evaluation parameters caused by the internal communication contention or control of the BSS comprises:
    in a case where the communication node determines that the plurality of pre-acquired test internal delays and the delay indication satisfy a first preset condition, determining the internal communication environment to be a main factor affecting a delay;
    wherein the delay evaluation parameters caused by the external interference of the BSS comprises a plurality of pre-acquired test external delays; and
    evaluating, by the communication node, the delay performance involved in the external interference of the BSS where the communication node is located according to the pre-acquired delay evaluation parameters caused by the external interference of the BSS comprises:
    in a case where the communication node determines that the plurality of pre-acquired test external delays and the delay indication satisfy a second preset condition, determining the external communication environment to be a main factor affecting a delay performance;
    wherein the delay indication comprises a maximum downlink delay and a maximum uplink delay;
    each of the plurality of pre-acquired test internal delays comprises a pre-acquired test uplink internal delay and a pre-acquired tests downlink internal delay; and
    each of the plurality of pre-acquired test external delays comprises a pre-acquired test uplink external delay and a pre-acquired tests downlink external delay; and
    wherein the method further comprises:
    for a plurality of test packets determined by the communication node, in a case where a maximum value or an average value of sums including a sum of the test uplink internal delay and the test uplink external delay corresponding to a same test packet is greater than the maximum uplink delay, determining, by the communication node, that a current communication environment fails to satisfy a maximum uplink delay of the service to be transmitted; and
    for a plurality of test packets determined by the communication node, in a case where a maximum value or an average value of sums including a sum of the test downlink internal delay and the test downlink external delay corresponding to a same test packet is greater than the maximum downlink delay, determining, by the communication node, that a current communication environment fails to satisfy a maximum downlink delay of the service to be transmitted.

13. A non-transitory computer-readable storage medium, which is configured to store computer programs which, when executed by a processor, perform a delay performance evaluation method, comprising:
    evaluating, by a communication node, a delay performance involved in an internal communication environment of a basic service set (BSS) where the communication node is located according to pre-acquired delay evaluation parameters caused by internal communication contention or control of the BSS; or evaluating, by a communication node, a delay performance involved in an external interference of a BSS where the communication node is located according to pre-acquired delay evaluation parameters caused by the external interference of the BSS, wherein before the processor evaluates the delay performance involved in the internal communication environment of the BSS where the communication node is located according to the pre-acquired delay evaluation parameters caused by the internal communication contention or control of the BSS, the method further comprises:

acquiring, by the communication node, a delay indication of a service to be transmitted;

wherein the delay evaluation parameters caused by the internal communication contention or control of the BSS comprises a plurality of pre-acquired test internal delays; and evaluating, by the communication node, the delay performance involved in the internal communication environment of the BSS where the communication node is located according to the pre-acquired delay evaluation parameters caused by the internal communication contention or control of the BSS comprises:

in a case where the communication node determines that the plurality of pre-acquired test internal delays and the delay indication satisfy a second preset condition, determining the internal communication environment to be a main factor affecting a delay;

wherein the delay indication parameters caused by the external interference of the BSS comprises a plurality of pre-acquired test external delays; and evaluating, by a communication node, a delay performance involved in an external interference of a BSS where the communication node is located according to pre-acquired delay evaluation parameters caused by the external interference of the BSS comprises:

in a case where the communication node determines that the plurality of pre-acquired test external delays and the delay indication satisfy a second preset condition, determining the external communication environment to be a main factor affecting the delay performance;

wherein the delay indication comprises a maximum downlink delay and a maximum uplink delay;

each of the plurality of pre-acquired test internal delays comprises a pre-acquired test uplink internal delay and a pre-acquired test downlink internal delay; and each of the plurality of pre-acquired test external delays comprises a pre-acquired test uplink external delay and a pre-acquired test downlink external delay; and wherein the method further comprises:

for a plurality of test packets determined by the communication node, in a case where a maximum value or an average value of sums including a sum of the test uplink internal delay and the test uplink external delay corresponding to a same test packet is greater than the maximum uplink delay, determining, by the communication node, that a current communication environment fails to satisfy a maximum uplink delay of the service to be transmitted; and for a plurality of test packets determined by the communication node, in a case where a maximum value or an average value of sums including a sum of the test downlink internal delay and the test downlink external delay corresponding to a same test packet is greater than the maximum downlink delay, determining, by the communication node, that a current communication environment fails to satisfy a maximum downlink delay of the service to be transmitted.

\* \* \* \* \*